United States Patent Office 2,979,814
Patented Apr. 18, 1961

2,979,814

JOINING OF GRAPHITE MEMBERS

Morris A. Steinberg, University Heights, Ohio, assignor to Horizons Incorporated, Cleveland, Ohio, a corporation of New Jersey No Drawing. Filed Dec. 4, 1957, Ser. No. 700,557

6 Claims. (Cl. 29—470)

This invention relates to an improvement in the joining of pieces of graphite to one another. More particularly one object of this invention is to provide a joint between two or more graphite members which retains its strength at temperatures up to as high as 3000° K.

Many methods have been proposed in the past for joining carbon to other members of carbon, metals, ceramics, and other materials. Such proposals have, generally, envisioned the use of tar, pitch, resins, and other adhesives as illustrated in United States Patents 473,841; 947,008; 1,158,171; 2,412,081; 2,670,311; and 2,513,230. Such adhesives function satisfactorily at relatively low temperatures, e.g. up to about 400° F., but lose their strength at higher temperatures and hence have only a limited applicability. Others have suggested the use of inorganic bonding materials such as sodium silicate, as in United States Patent 1,709,892, or elemental bonding agents such as selenium, or tellurium, as in British Patent 604,293. A more recent proposal involves the use of a solder based on a metal such as copper and a refractory bonding material such as titanium hydride or zirconium hydride, as described in United States Patent 2,570,248. One common difficulty with each of the foregoing has been inability of the joint to perform at elevated temperatures. Another disadvantage inherent in many such joints arises from the presence of a foreign material other than carbon, at the joint.

In an earlier application filed by me, Serial No. 612,599 filed September 28, 1956, there was disclosed a process in which graphite members could be bonded to other graphite members or to other carbonaceous materials by materials which functioned in an entirely different manner from the simpler adhesives of the prior art and which produced structures which remained bonded at elevated temperatures.

Briefly, instead of an adhesive-type bonding material, it was proposed that a material which is capable of entering into chemical combination with the graphite should be used to effect the bonding. Thus, elemental titanium, zirconium, hafnium, vanadium, niobium, tantalum, chromium, molybdenum, tungsten, or some of the rare earths or indeed any elements which form carbides, were envisioned as useful for the accomplishment of the desired bond. In the resulting article, the bond between two graphite bodies would then consist of metal carbide.

The present application constitutes a continuation-in-part of application Serial No. 612,599.

I have now discovered that a joint in which carbon is joined directly to carbon is to be preferred, for many purposes, over prior art joints in which one or more metals or metal compounds served as the "cement" between the carbon bodies being joined. In order to achieve a carbon to carbon joint free of any foreign material or adhesive, only certain of the carbide-forming elements disclosed in my earlier application may be used. As taught therein, the carbide-forming elements employed, either singly or in combination, must be those whose carbides may contain a variable amount of carbon and this carbon must be capable of precipitating as graphite under the processing conditions. The temperature and pressure at which this will occur is determined by the carbide formed and decomposed.

It has been further found that only those elements which form meta-stable carbides and which can thereafter be eliminated from the joint will yield a metal-free carbon to carbon joint having the properties desired. I have found two methods applicable to the removal of the metal of the meta-stable carbide from the region of the joint. In the first, the joined members are subjected to heating either in an inert gas atmosphere, such as one of the noble gases, or preferably in a vacuum for a time sufficient, at the temperature selected, to accomplish decomposition of the meta-stable carbide and the escape of the metal into the atmosphere. In the second, meta-stable carbides which decompose on cooling, e.g. magnesium carbide, are chosen for the initial bond and, after the bond has formed, the carbide is permitted to decompose, by cooling, to produce a volatile metal and graphite as the end products.

Below there are tabulated many of the elements which form carbides, together with certain of their properties.

| ELEMENT | | | CARBIDE | |
|---|---|---|---|---|
| Element | Melting Point, °C. | Boiling Point, °C. | Carbide | Melting Point and Stability of Carbide |
| Na | 97.7 | 892 | Na$_2$C$_2$ | unstable. |
| K | 63 | 770 | K$_2$C$_2$ | unstable. |
| Be | 1280 | 2770 | Be$_2$C | unstable Be and graphite form. |
| Mg | 650 | 1202 | MgC$_2$ | unstable above 800° C. decomposes to Mg(gas) and C. |
| Ca | 850 | 1440 | CaC$_2$ | decomposes on heating. |
| Al | 660 | 2060 | Al$_4$C$_3$ | 2200° C. Forms at 1000° C. Unstable above 1800° C. Sublimes decomposes. |
| La | 826 | 1519 | LaC$_2$ | unstable on heating. |
| Ce | 600 | ? | CeC$_2$ | unstable. |
| Ti | 1,730 | | TiC | 3250° C. stable. |
| Zr | 1,850 | | ZrC | 3175° C. meta-stable. |
| Hf | 2,500 | | HfC | 3890° C. stable. |
| Si | 1,430 | 2300 | SiC | unstable above 2100° C. C rejected. |
| V | 1,700 | | VC | decomposes. |
| Nb | 2,500 | | NbC | stable. |
| Ta | 3,000 | | TaC | stable. |
| Cr | 1,950 | | Cr$_3$C | meta-stable 1895° C. |
| Mo | 2,600 | 4800 | MoC | 2695° C. stable. |
| | | | Mo$_2$C | 2690° C. stable. |
| W | 3,380 | | WC | 2830° C. stable. |
| | | | W$_2$C | 2700° C. stable. |
| U | 1,130 | 2065 | UC | unstable. |
| Fe | 1,537 | 2740 | Fe$_3$C | melts to take in C rejects on cooling. |

It will be seen that many of the carbide-forming elements are disqualified for the bonding of carbon directly to carbon either because they form extremely stable carbides which are not decomposed by heating, or, in instances where the carbide is decomposed, the metal cannot be volatilized to effect its removal from the region of the joint. Thus molybdenum which has been used before, to join graphite to metal or to graphite, as described in United States Patent 2,431,975, cannot be used to produce a metal-free joint because the metal does not exhibit a sufficient vapor pressure at elevated temperatures to permit its removal after the carbide has been decomposed, for instance, by heating to 3000° C.

Of the carbide-forming elements listed above, I have found the following to be useful in my process: aluminum, zirconium, magnesium and beryllium.

In accordance with my invention I provide a joint-forming or bonding material, such as elemental aluminum metal, either in finely divided form, or in the form of a thin sheet or wafer. When the finely divided metal is used it may be as a free flowing dry powder, or as a slurry or paste composition containing the bond-forming material as a powder. When a solid piece of bonding material is used it may be in the form of a thin layer or wafer-shaped to any desired configuration. The bond-forming material is applied to the surfaces to be joined and then heat, or a combination of heat and pressure are applied to raise the temperature of the joint region to an extent necessary to form carbide zone.

The joining material may, as previously indicated, consist either of any of the elements designated as suitable, or of mixtures of two or more of such elements or their alloys. When used in finely divided form, the bonding material should be of a reasonably fine particle size. Dry powders of between 100 mesh (Tyler Standard) and 325 mesh (Tyler Standard) have been successfully used, and the particle size does not appear to be critical. Finer particle sizes permit the application of elevated temperatures for shorter intervals than coarser particles. The choice of a particle size will also in some instances be conditioned to some extent by the area of the bond.

The temperature at the interface should initially approach 1800° C. to 2500° C., and may be even higher, depending on the specific joining material used. Such temperatures are conveniently obtained electrically, for instance, by resistance heating or induction heating or even by an arc. Whatever the means employed, it is necessary that the temperature developed at the interface be sufficient for a carbide to form at the interface, so that the bond initially comprises the carbide so formed, together with any carbon rejected by the carbide. Thereafter, as the heating is continued, at temperatures sufficient to decompose the carbide and then to vaporize the element resulting from the decomposition of the carbide. At the same time, the carbon formed by the decomposition of the carbide precipitates under the existing conditions, into flakes perpendicular to the joint surface.

Many carbides have a tendency to fracture under tension. Hence, when a combination of heat and pressure is used to form the joint, it is preferable to use moderate pressures, for example pressures up to 1500 pounds per square inch, to avoid destruction of the joint or rupture of the graphite.

The following examples will serve to further illustrate the practice of my invention and are to be taken as illustrative and not limitative thereof.

*Example I*

Two graphite rods, one-half inch in diameter, were clamped in a resistance welder so that they were butted together with a layer of —200 mesh (Tyler Standard) zirconium metal powder between their ends. A pressure of 200 pounds was used to urge them together. The assembly was mounted in a furnace provided with means to maintain an argon atmosphere surrounding the assembly. The rods were heated by resistance heating by passing a direct current through the rods sufficient to produce a temperature of about 2000° C. at the joint. The pressure increased to 350 pounds as the temperature was raised. The interface region remained at about 2150° C. for 10 seconds, and then the heating was discontinued. When the rods had cooled, it was found that the two rods were firmly bonded together. Photo-micrographs taken of the joint region showed that considerable graphitization had occurred. While I do not wish to be bound by any specific theory, I believe that at the elevated temperature to which the zirconium-graphite assembly was heated, some zirconium carbide formed and that as the carbide cooled, some carbon precipitated from the carbide and that this carbon, under the prevailing conditions, had become converted to graphite. The resultant joint, then, is characterized as a graphite to graphite joint bonded by graphite. Because of the appearance and strength of this joint, I believe that the decomposition of the bonding material produced graphite flakes which grew perpendicular to the joint with the result that a partially graphitized joint was produced, and at the same time at elevated temperatures some of the zirconium may have been volatilized. It will be seen, therefore, that by maintaining the materials at a sufficiently elevated temperature below the temperature at which the graphite volatilizes that substantially all of the carbide-forming metal itself may be eliminated from the joint region and that ultimately an all-graphite bond is formed in which the graphite flakes formed by the decomposition of the carbide have grown into each of the members being united. Also, the zirconium carbide which melts at 3250° C. will dissolve extra carbon above stoichiometry and give an eutectic of zirconium carbide saturated with carbon at about 2550° C. On cooling this extra carbon is rejected as graphite.

*Example II*

The procedure employed in Example I was repeated at a temperature of about 2325° C. for 10 seconds and at a slightly higher initial pressure of 250 pounds. When tested in tensile the joined rods broke in the graphite and not in the joint, showing that the joint was at least as strong as the graphite.

*Example III*

Two pieces of ATJ graphite were butted together using minus 325 mesh (Tyler Standard) aluminum powder at the joint. Over a period of four minutes the assembly was heated to 1800° C. to form a joint bonded by aluminum carbide. The argon atmosphere was pumped from the furnace and the body was held for less than one minute at 2100° C. in a vacuum. The aluminum carbide decomposed and the aluminum volatilized away leaving a substantially metal-free bond.

One further matter should be noted in connection with my invention. Because of its properties, graphite is an excellent material for the construction of reactors and of other apparatus for processing fissionable materials. My invention is peculiarly adapted to the fabrication of apparatus to be used in processing such material. By selecting the proper carbide-forming bonding materials, joints may be formed wherein the resulting metal-free zone has substantially the same neutron capture as the other graphite portions of the apparatus.

I claim:

1. A method of bonding graphite to graphite by means of a metal-free bond consisting essentially of carbon which comprises: bringing at least two pieces of graphite to be joined into abutting relationship with a finely divided bonding material selected from the group consisting of aluminum, beryllium, magnesium, and zirconium disposed at the interface constituting the joint, heating the region adjacent the joint to a temperature sufficient to form a carbide by reaction between said finely divided solid and the graphite pieces being joined, further heating the region adjacent the joint to a temperature sufficient to decompose the carbide and to boil away the resulting elemental metal released by decomposition of the carbide, thereby producing a joint formed entirely of carbonaceous material.

2. The method of claim 1 in which the heating is accomplished in an inert atmosphere.

3. The method of claim 1 in which the bonding material is aluminum.

4. The method of claim 1 in which the bonding material is zirconium.

5. The method of claim 1 wherein the further heating is performed while the region adjacent the joint is evacuated.

6. An article of manufacture having a carbon to carbon joint produced by the method of claim 1.

References Cited in the file of this patent

UNITED STATES PATENTS

| | | |
|---|---|---|
| 968,949 | Jaburg | Aug. 30, 1910 |
| 2,093,390 | Wyckoff | Sept. 14, 1937 |
| 2,195,314 | Lincoln | Mar. 26, 1940 |
| 2,431,975 | Yockey et al. | Dec. 2, 1947 |
| 2,491,284 | Sears | Dec. 13, 1949 |
| 2,686,958 | Eber et al. | Aug. 24, 1954 |
| 2,739,375 | Coxe | Mar. 27, 1956 |